United States Patent Office 3,788,985
Patented Jan. 29, 1974

3,788,985
METHOD OF CLEANING SOLIDS-CONTAINING SEWAGE
Harald Jüntgen, Karl Knoblauch, and Dieter Zündorf, Essen, and Günther Gappa, Gelsenkirchen, Germany, assignors to Bergwerksverband GmbH, Essen, Germany
Filed Dec. 2, 1971, Ser. No. 204,043
Claims priority, application Germany, Dec. 16, 1970, P 20 61 877.3
Int. Cl. B01d 15/02
U.S. Cl. 210—33
12 Claims

ABSTRACT OF THE DISCLOSURE

A mass of particulate adsorbent matter, such as activated carbon, is advanced at two speeds in a reactor from the inlet to the outlet thereof, being continuously recirculated to the inlet. Into this moving column of adsorbent matter is admitted, transversely to the direction of movement of the column, a stream of sewage distributed over at least substantially the length of the column. Solids are retained in a portion of the moving column advancing at a first speed and at the side opposite the entry side clarified liquid issues from the column.

BACKGROUND OF THE INVENTION

The present invention relates generally to sewage treatment, and more particularly to a method of treating solids-containing sewage.

In the treatment of solids-containing sewage, that is waste water, it is already known to provide carbonaceous adsorbent materials through which sewage is circulated until the adsorbent material is exhausted. Thereupon the adsorbent material is regenerated to remove the retained solids therefrom, for instance by heating it to temperatures between 600 and 900° C. The adsorbent function of such matter, that is the function of removing solids from sewage, may be partly or wholly continuous; for this purpose the adsorbent matter is passed through a reactor from above in downward direction, for instance in form of an advancing column of matter, and the sewage to be treated is passed through adsorbent material of the column in counterflow thereto. Before the sewage is admitted into the reactor it is usually subjected to a preliminary treating operation in which most of the nonsoluble matter is removed by filtration.

Experience has shown that in the actual use of this prior-art approach to the treating of solids-containing sewage, there is a tendency towards clogging of the interstices between the particulate adsorbent matter due to retention therein of the non-soluble contents of the sewage which have not been fully removed by the preliminary filtration. Inasmuch as the movement of the sewage is in counterflow to the direction of advancement of the column of adsorbent matter, it is understandable that such clogging occurs primarily in the region where the sewage is admitted into the advancing column of adsorbent matter. Evidently, the solids-containing sewage will there contact paticulate adsorbent matter which—having come from the inlet end of the reactor and having been in use throughout its travel to the outlet end—has already reached the limits of its adsorbing and cleaning capabilities.

It is self-evident that this is a highly disadvantageous state of affairs. Added to these problems is the fact that this known approach necessitates that high pressure be applied to the sewage in order to be able to accomplish the passage thereof through the column of adsorbent material when clogging begins and when consequently, the resistance of the adsorbent material to flow of the sewage through the column increases.

SUMMARY OF THE INVENTION

It is a general object of the present invention to overcome the disadvantages of the prior art.

More particularly, it is an object of the present invention to provide an improved method of treating solids-containing sewage which is not possessed of any of the aforementioned disadvantages.

In pursuance of these and other objects which will become apparent hereafter, one feature of the invention resides in a method of treating solids-containing sewage which, briefly stated, comprises the first step of advancing a mass of particulate adsorbent matter in a path from an inlet to an outlet of the same; and the second step of discharging into the advancing mass at one side of the path and in a direction transverse to the same, a flow of sewage distributed over at least substantially the entire distance between the inlet and the outlet, so that solids in the sewage are retained in the mass whereas clarified liquid issues from the latter at the opposite side of the path.

We currently prefer to use as the particulate adsorbent matter, activated carbon, but it is pointed out that any of he adsorbent materials utilized for the same purpose in the prior ar can be employed with the present method including coarse-grained or coarse-mesh and special coke, particularly specially treated coke blanks.

All that is essential in accordance with the present invention is that the flow of sewage be passed into and through the mass of adsorbent matter, distributed over substantially the enire length of for instance a column formed by the adsorbent matter, and in a direction transverse to the advancement of the adsorbent matter. The adsorbent matter, in form of a column or the like, may be advanced either in horizontal or in upright position, for instance in vertical position, and the sewage can pass through it in any desired direction as long as the direction is transverse to the advancement of the body of particulate matter. In other words, if, for instance, the body or mass of particulate matter advances in horizontal direction, the sewage may pass through it from above in downward direction or from below in upward direction. It is further advantageous in accordance with the present invention that the length of the mass of particulate matter, that is its dimension in the direction of movement, be approximately twice and preferably between 5 and 10 times the diameter of the mass, especially of a column into which the mass may be formed.

We have found that clogging—as discussed above—which is almost entirely unavoidable in accordance with the prior art, is impossible in the method according to the present invention to all intents. Evidently this is a significant advantage.

However, the advantages of the present invention with respect to the prior art are not thereby exhausted. Instead, the present invention makes it possible to make the preliminary cleaning apparatus, in which the sewage undergoes a first treatment for removal of the non-soluble matter therefrom, smaller than was heretofore necessary because some of this non-soluble matter can now be retained in the mass of particulate adsorbent matter without any disadvantageous consequences, that is without clogging. Furthermore, the pressure loss in the mass of particulate adsorbent matter is very low and because of this small loss, higher throughput factors per cubic meter of particulate adbsorbent matter can be achieved; this, in turn, means that smaller reactors can be utilized for treating the same quantities of sewage for which larger reactors were heretofore required, or, conversely, if a reactor is made as large as those according to the prior art, a larger quantity of sewage can be processed therein..

According to a currently preferred embodiment of the invention, we provide that that part of the mass of particulate adsorbent matter, which is closer to the side at which the sewage enters into the mass, will advance at a rate of speed which is different from the rate of speed at which the remainder of the mass moves, that is that part of the mass which is closer to its side at which clarified liquid will issue. The differential may be higher or lower, that is the first-mentioned part may advance at a greater or at a lesser rate of speed than the last-mentioned part. In this embodiment even greater assurance is obtained against the possibility of clogging.

It is, in fact, possible to so coordinate the rate of advancement of the first-mentioned and last-mentioned parts of the mass of particulate adsorbent matter with respect to the degree of contamination or impurity of sewage, that predominantly non-soluble solids are retained in the first-mentioned part, whereas absorptive retention of the dissolved organic substances takes place predominantly in the last-mentioned part. In this manner, it is possible, in addition, to charge or load the particulate adsorbent matter making up the first-mentioned part without interference with a determined quantity of organic matter or contaminants which are evenly distributed throughout the particulate adsorbent matter of the last-mentioned part.

This last consideration is of substantial importance for a certain reason, namely the fact that thermal regeneration (i.e. heating) of the carbonaceous or carbon-containing adsorbent matter always brings with it a certain combustion loss of such matter. If the contaminants are distributed uniformly throughout the particulate matter, that is if the particulate matter is uniformly "charged" with such contaminants, the combustion loss has been found to be substantially lower than if the particulate matter is non-uniformly charged; the reason for this is that in the case of non-uniform charging, a part of the particulate adsorbent matter will necessarily become gasified whereas at uniform charging the thermal regeneration can be so conducted that substantially only the retained contaminants undergo gasification. We have observed that if the particulate matter is charged uniformly, the loss of such particulate matter during thermal regeneration amounts to approximately 3%, whereas in the case of non-uniform charging the loss may be as high or higher than 10%.

It may be advantageous in some circumstances, but is not absolutely necessary, that that part of the particulate adsorbent matter which constitutes the first-mentioned part of a two-part mass or column, that is the part into which the sewage enters directly, be withdrawn from the reactor and instead of undergoing regeneration, be washed to remove the sludge which is usually carries, and thereupon be recirculated directly into the inlet of the reactor. The remainder of the mass, that is the above discussed second-mentioned part, undergoes regeneration before it is returned to the inlet of the reactor.

The flow speed of the sewage in the reactor, that is through the mass of advancing particulate adsorbent matter, should be approximately 5–100 m./h., preferably between substantially 20 and 60 m./h. The speed of advancement of the particulate adsorbent matter, on the other hand, should be between substantially 0.01–5 m./h., advantageously between 0.03–1 m./h.

The cross-section of a column of particulate adsorbent matter, that is if the mass of particulate adsorbent matter is confined in such a manner as to form a column, should be approximately 0.5–4 meters, and if a dual column is involved (having the aforementioned first part and second part) then the part of the column containing the first part of the particulate adsorbent matter should have approximately 0.3–1.5 meter diameter and the part of the column containing the remainder of the particulate adsorbent matter should have 0.5–3 meter diameter, preferably between 1 and 2 m.

In order to aid or effect oxidation of salts contained in the sewage and/or for decomposition of organic substances, the invention also proposes that air or oxygenated air be admitted into the sewage before the latter enters into the mass of particulate adsorbent matter. On the other hand, it is similarly possible to admit air or oxygenated air into the mass of particulate adsorbent matter itself, preferably at various spaced locations.

The novel features which are considered as characteristic for the invention are set forth in particular in the appended claims. The invention itself, however, both as to its construction and its method of operation, together with additional objects and advantages thereof will be best understood from the following description of specific embodiments when read in connection with the accompanying drawings.

DESCRIPTION OF THE PREFERRED EMBODIMENTS

Figure 1:
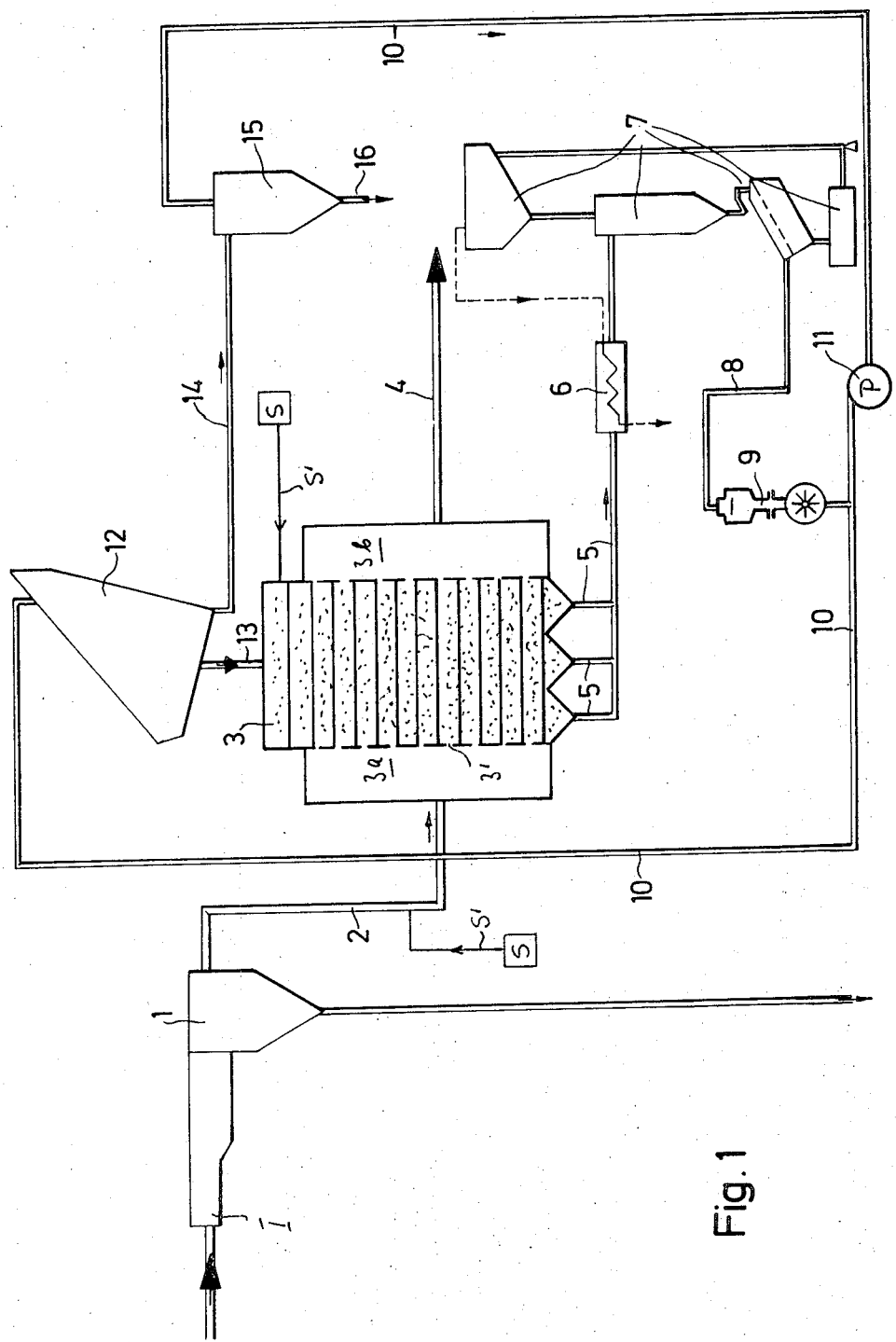
FIG. 1 is a diagrammatic illustration of an installation for carrying out the present invention.

Discussing now the drawing in detail, and firstly FIG. 1 thereof, it will be seen that the installation illustrated therein for carrying out the present method is provided with an inlet I, at which sewage to be treated is admitted in the direction of the arrow, that is towards the right in FIG. 1. From the inlet I the sewage enters into a sludge separator 1 in which the larger or coarser contaminants of the sewage are mechanically removed. It is not believed to be necessary to provide detailed descriptions of this or any of the other devices utilized in the installation of FIG. 1 (and subsequently that of FIG. 2) because these devices and components are well known per se to those skilled in the art and largely find use in apparatus known from the prior art for sewage treating purposes. The invention resides in a method of sewage treatment and can be carried out with known apparatus as long as the apparatus is capable of passing the sewage through the mass of particulate adsorbent matter in direction transverse to the advancement of the mass.

From the sludge separator 1 the sewage passes via the conduit 2 into a recator 3. The reactor 3 is filled with a column (in this case an upright column) of particulate adsorbent matter, for instance carbonaceous adsorbent matter, such as activated carbon. The material of this column advances slowly from the inlet at the upper end of the reactor 3 to the outlet at the lower end thereof, that is in downward direction. Inasmuch as the particulate matter leaving the reactor at the bottom outlet thereof is continuously returned to the inlet after some processing, the column never loses in height and always fills the reactor to the desired extent. FIG. 1 clearly shows that the conduit 2 communicates with one lateral side of the thus established column, and for this purpose the reactor 3 has a lateral chamber 3a which extends over all or most of its height and with which the conduit 2 communicates to discharge sewage thereinto. The interior of the chamber 3a communicates with the interior of the main chamber of the reactor 3 in which the advancing mass or column of particulate adsorbent material is accommodate, by the sewage-permeable partition 3' which is illustrated diagrammatically, so that sewage filling the chamber 3a can enter uniformly over almost the entire height of the column of particulate adsorbent matter, in direction transverse to the downward direction of movement of this column.

Solids in the sewage and dissolved organic matter are retained in the column, whereas clarified liquid is collectel in the chamber 3b at the side of the column opposite the chamber 3a. Chamber 3b is similar to the chamber 3a and communicates with the main chamber of the reactor by means of the additional illustrated permeable partition. From the chamber 3b the clarified liquid is exhausted via the conduit 4.

When the particulate adsorbent matter issues from the reactor 3, in the illustrated embodiment at the lower end thereof, it passes via the conduits 5 into a preliminary dryer of known construction and from there into a regenerating system 7 in which it is regenerated by heating to between 600 and 900° C. This also is known from the art and equipment for such purposes is known and available to those skilled in this field.

Once regenerated the now fully reusable particulate adsorbent matter is returned via conduit 8 and metering device 9 (known per se) into the supply conduit 10. In the supply conduit 10 it is pumped into the hopper 12, with the aid of water and a pump 11. From hopper 12 the material enters into the inlet of reactor 3 via the conduit 13 to resume its slow downward advancement through the reactor. The water which has been used for conveying the regenerated particulate adsorbent matter through the conduit 10 into the hopper 12 becomes separated in the latter from the adsorbent matter and is supplied via conduit 14 from the hopper 12 to the cyclone 15 (known per se) in order to free it of sludge which it may carry. Any sludge separated from the water in the cyclone 15 is discharged from the latter via conduit 16, whereas the water is returned into the conduit 10 upstream of the suction side of the pump 11.

As mentioned earlier, air or oxygenated air may be admitted either to the sewage before entering into the reactor 3, or into the adsorbent matter directly. This is diagrammatically illustrated in FIG. 1, where the boxes S represent sources of air or oxygenated air. These sources S may communicate via conduits S' with conduit 2 (or, to give another example, with chamber 3a), or with the interior of the reactor 3. Of course, the two possibilities can also be used together.

Figure 2:
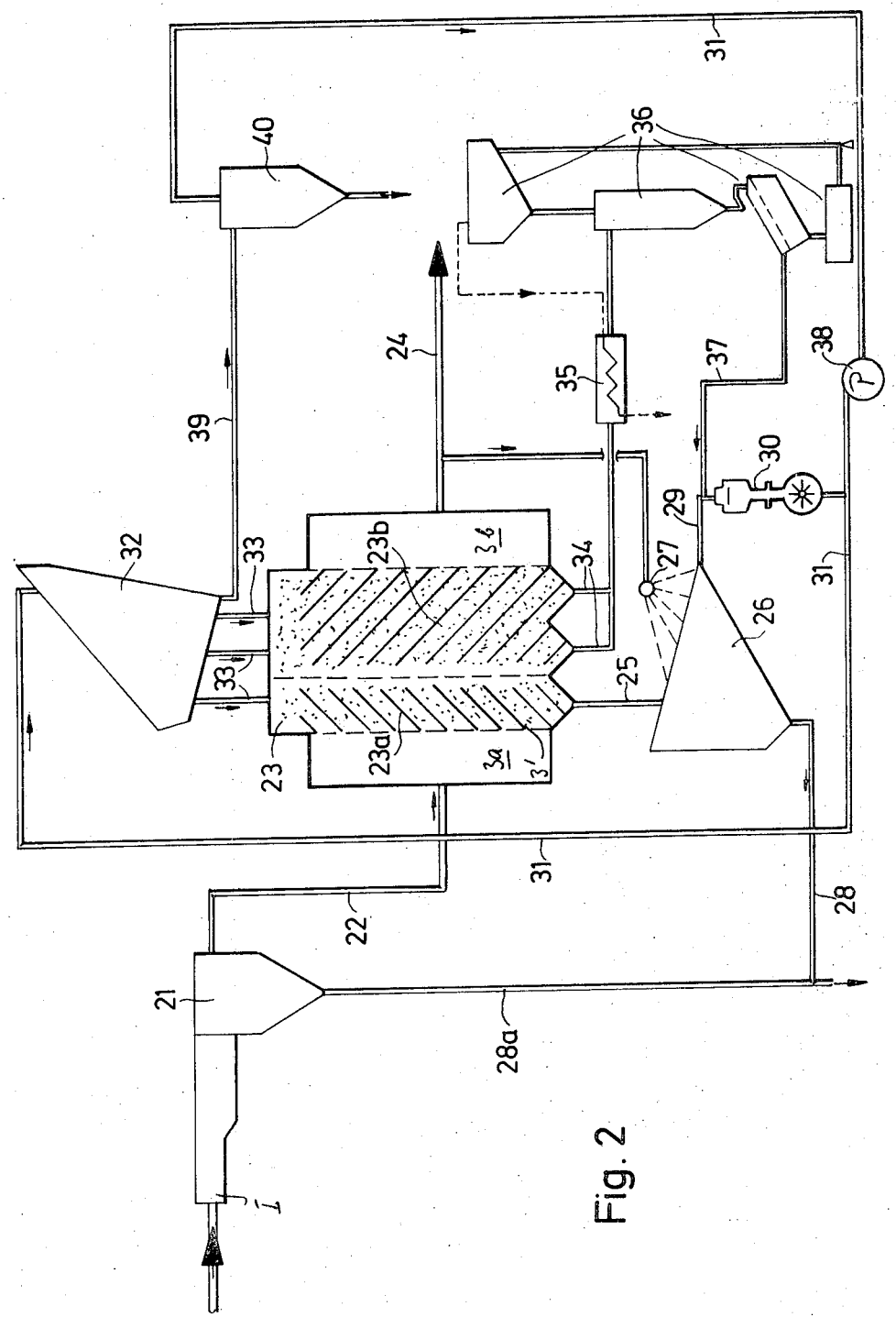
FIG. 2 is a view similar to FIG. 1, illustrating a different installation for carrying out a further embodiment of the invention.

Coming now to FIG. 2, it will be seen that the installation here illustrated is intended for carrying out a further concept according to the present invention, namely a somewhat different method. Here, again, the inlet is identified with reference character I, and from the inlet the sewage to be treated is supplied to a sludge separator 21 which may be identical with the one designated in FIG. 1 with reference numeral 1. From the separator 21, the pre-treated sewage is supplied via conduit 22 to a reactor 23 which again is illustrated as an upright reactor. Sludge removed from the sewage in the separator 21 is discharged from the latter via the outlet conduit 28a.

Contrary to FIG. 1, the reactor 23 of FIG. 2 is longitudinally (in this case vertically) separated into two compartments 23a and 23b, both of which contain particulate adsorbent matter. However, the part 23a contains one column of such matter and the part 23b (which communicates with the part or chamber 23a) contains another column of such matter. The chambers 3a and 3b and the partition 3' are provided as in FIG. 1.

Sewage is supplied via conduit 22 into the chamber 3a where it is again distributed over substantially the entire length (here height) of the reactor 23, to flow transversely of the direction of advancement of the columns of particulate adsorbent matter in the chambers 23a and 23b, through these columns and into the chamber 23b from which it is discharged via the outlet conduit 24 as clarified liquid.

As in FIG. 1, the material or matter of the two columns formed in the compartments 23a and 23b continuously advances from the upper inlet towards the lower outlet of the reactor 23. The particulate adsorbent matter in the compartment 23a is discharged via conduit 25 and enters into the receptacle 26 wherein it is washed and has adhering sludge removed, for instance by spraying it with water or another liquid from the spraying device 27. Sludge removed in this manner is supplied via conduit 28 from the receptacle 26 to the conduit 28a, where it is discharged together with sludge derived from the sludge separator 21.

The particulate adsorbent matter thus cleaned is recirculated from receptacle 26 via conduit 29 to the metering device 30, and from there it is supplied by the pump 38 via the supply conduit 31—in which the pump circulates water—into the hopper 32. From hopper 32 it returns via conduit 33 into the inlet of the reactor 23. Water separated from the material in the hopper 32 is withdrawn via conduit 39 and supplied into the cyclone 40 corresponding to the cyclone 15 of FIG. 1, where it is freed of any adhering sludge and returned into the part of the supply conduit 31 which communicates with the suction side of the pump 38.

The particulate adsorbent matter or material which leaves the column formed in the compartment 23b of the reactor 23 at the lower end of the reactor, is supplied via conduit or conduits 34 to the pre-drying device 35 corresponding to the device 6 of FIG. 1. From there it advances into the regenerating system 36 where it is regenerated by heating to 600–900° C.

The regenerated particulate matter is supplied into the supply conduit 31 via conduit 37 and metering device 30, so that it also is returned to the hopper 32, where it is discharged into the inlet of the reactor 23.

The thus returned reactivated particulate adsorbent matter becomes distributed in part into the compartment 23a and in part into the compartment 23b.

According to the present method, the column of particulate adsorbent matter in the compartment 23a should move at a rate of speed different from—preferably greater than—the movement of the column in the compartment 23b for the purposes which have already been fully described.

For better understanding of the present invention, two examples will now be given.

EXAMPLE I 90 m.³ of sewage with 2 g. of solids per m.³ and with dissolved substances of 500 mg. carbon/l. were circulated per hour through a reactor according to FIG. 1. The base area of the reactor was 1 by 2 meters, and the height was 4 meters. The flow cross-section thus was 1 by 4 meters.

The reactor was charged with particulate adsorbent matter in form of activated carbon which passed through the reactor from the upper inlet to the lower outlet with a dwell time of 50 hours at speed of 0.08 m./h. The flow speed of the sewage in the reactor was 45 m./h.

Water discharged from the reactor, that is clarified sewage water, was clear and was found to contain only 10 mg. of carbon/l. (liter).

The activated carbon discharged from the reactor was washed to remove the adsorbed particulate contaminants and was thereafter reheated to 750° C. in order to reactivate it, whereupon it was returned to the inlet of the reactor.

EXAMPLE II 90 m.³ sewage with 40 g. of solids content per m.³ and with dissolved substances of 600 mg. of carbon/l. were passed through a reactor according to FIG. 2 per hour. The base area of the compartment 23a was 1 by 1 m., that of the compartment 23b 1 by 2 and the overall height of the reactor was 4 m.

The reactor was charged with particulate adsorbent matter in form of washed anthracite of 3 mm. mesh. This material passed through the reactor from the upper inlet to the lower outlet; in the compartment 23a it had a dwell time of 30 hours, amounting to a speed of advancement of 0.133 m./h. In the compartment 23b it had a dwell time of 40 hours, meaning a speed of 0.01 m./h. Thus, the flow speed of the sewage circulated through was 22.55 m./h. Again it was found that clarified vancement of the particulate adsorbent matter therethrough was 2.5 m./h. Again it was found that clarified liquid leaving the reactor via the conduit 24 was clear; it contained only 12 mg. of carbon/l.

The adsorbent matter leaving the chamber or compartment 23a was washed in water and then returned to the inlet of the reactor, becoming distributed over both the compartments 23a and 23b. The same distribution to both compartments took place for the adsorbent matter leaving the compartment 23b and which was reactivated by heating to 850° C. before it was returned to the inlet of the reactor.

It will be understood that each of the elements described above, or to or more together, may also find a useful application in other types of applications differing from the types described above.

While the invention has been illustrated and described as embodied in the treating of solids-containing sewage it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that from the standpoint of prior art fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims.

We claim:

1. A method of treating solids-containing sewage, comprising the first step of continuously advancing a mass of particulate adsorbent material in a predetermined path, at a first speed in a first region adjacent one side of said path and at a second speed in a second region adjacent the opposite side of said path, and the second step of passing a flow of solids-containing sewage through said advancing mass transversely of said path from said one side towards and outwardly beyond said opposite side, distributed over at least substantially the entire length of said path, whereby the solids contained in said sewage are retained substantially by the particulate material advancing in said first region and clarified liquid issues from said mass at said opposite side of said path.

2. A method as defined in claim 1, wherein the second step comprises passing the sewage through said mass from said one to said opposite side at a flow speed of between substantially 5 and 100 m./h.

3. A method as defined in claim 2, wherein said flow speed is between substantially 20 and 60 m./h.

4. A method as defined in claim 1, wherein the speed of advancement of said matter in said first region is higher than in said second region.

5. A method as defined in claim 1, wherein said first step comprises advancing said mass at a speed of between 0.01–5 m./h.

6. A method as defined in claim 1, wherein said first step comprises advancing said mass at a speed of between 0.03–1 m./h.

7. A method as defined in claim 1; further comprising the additional step of continuously recirculating said adsorbent matter, so that said mass advances continuously.

8. A method as defined in claim 1; further comprising the step of confining said mass so that the same forms a single column extending in said path and having a diameter between substantially 0.5 and 4 m.

9. A method as defined in claim 1; further comprising the step of confining said mass so that it forms a first column extending in said path at said one side and having a diameter of between substantially 0.5–1.5 m., and a second column, adjacent said first column also extending in said path but at said opposite side and having a diameter of between substantially 0.5–3 m.

10. A method as defined in claim 9, wherein said diameter of said second column is between substantially 1–2 m.

11. A method as defined in claim 1; and further comprising the step of admitting air into at least one of said mass and said sewage.

12. A method as defined in claim 1; and further comprising the step of admitting oxygenated air into at least one of said mass and said sewage.

References Cited

UNITED STATES PATENTS

| | | | |
|---|---|---|---|
| 744,764 | 11/1903 | Kathol | 210—268 |
| 2,200,580 | 2/1938 | Pruss et al. | 210—150 X |
| 2,287,983 | 2/1939 | Gavett | 210—80 X |
| 3,244,621 | 9/1962 | Bouthilet | 210—33 X |
| 3,537,582 | 11/1970 | Demeter | 210—189 |
| 3,674,684 | 7/1972 | Gollan | 210—33 |

JOHN ADEE, Primary Examiner

I. CINTINS, Assistant Examiner

U.S. Cl. X.R.

210—60, 63, 189